(12) United States Patent
Micks et al.

(10) Patent No.: US 9,864,918 B2
(45) Date of Patent: Jan. 9, 2018

(54) PREDICTING VEHICLE MOVEMENTS BASED ON DRIVER BODY LANGUAGE

(71) Applicant: Ford Global Technologies, LLC, Dearborn, MI (US)

(72) Inventors: Ashley Elizabeth Micks, Mountain View, CA (US); Harpreetsingh Banvait, Sunnyvale, CA (US); Jinesh J Jain, San Mateo, CA (US); Brielle Reiff, Cincinnati, OH (US)

(73) Assignee: Ford Global Technologies, LLC, Dearborn, MI (US)

( * ) Notice: Subject to any disclaimer, the term of this patent is extended or adjusted under 35 U.S.C. 154(b) by 99 days.

(21) Appl. No.: 14/932,160

(22) Filed: Nov. 4, 2015

(65) Prior Publication Data

US 2017/0124407 A1    May 4, 2017

(51) Int. Cl.
*G06K 9/00* (2006.01)
*G06T 7/00* (2017.01)
*B60W 40/08* (2012.01)

(52) U.S. Cl.
CPC ......... *G06K 9/00845* (2013.01); *B60W 40/08* (2013.01); *G06K 9/00228* (2013.01); *G06K 9/00335* (2013.01); *G06K 9/00355* (2013.01); *G06K 9/00604* (2013.01); *G06T 7/004* (2013.01); *G06T 2207/30196* (2013.01); *G06T 2207/30268* (2013.01)

(58) Field of Classification Search
CPC ........... G06K 9/00845; G06K 9/00335; G06K 9/00228; G06K 9/00355; G06K 9/00604; G06T 7/004; G06T 2207/30196; G06T 2207/30268; B60W 40/08
See application file for complete search history.

(56) References Cited

U.S. PATENT DOCUMENTS

| 7,124,027 | B1 * | 10/2006 | Ernst, Jr. | ............... B60W 30/09 340/435 |
| 8,655,537 | B2 | 2/2014 | Ferguson | |
| 8,660,734 | B2 * | 2/2014 | Zhu | ...................... G05D 1/0214 701/23 |
| 8,788,134 | B1 | 7/2014 | Litkouhi | |
| 9,014,905 | B1 | 4/2015 | Kretzschmar | |

(Continued)

OTHER PUBLICATIONS

Doshi et al. On the Roles of Eye Gaze and Head Dynamics in Predicting Driver's Intent to Change Lanes, IEEE, Sep. 2009.*

*Primary Examiner* — John Strege
(74) *Attorney, Agent, or Firm* — David R. Stevens; Stevens Law Group

(57) ABSTRACT

Systems, methods, and devices for predicting driver intent and future movements of a human driven vehicles are disclosed herein. A system for predicting future movements of a vehicle includes a camera system, a boundary component, a body language component, and a prediction component. The camera system is configured to capture an image of a vehicle. The boundary component is configured to identify a sub-portion of the image corresponding to an area where a driver of a vehicle is located. The body language component configured to detect a driver's body language. The prediction component configured to predict future motion of the vehicle based on the driver's body language detected by the body language component.

15 Claims, 6 Drawing Sheets

(56) References Cited

U.S. PATENT DOCUMENTS

| | | | |
|---|---|---|---|
| 2010/0131148 A1* | 5/2010 | Camhi | B60W 40/09 701/31.4 |
| 2010/0205132 A1* | 8/2010 | Taguchi | G08G 1/167 706/46 |
| 2011/0074916 A1* | 3/2011 | Demirdjian | B60R 1/00 348/36 |
| 2011/0246156 A1* | 10/2011 | Zecha | G08G 1/166 703/6 |
| 2012/0083960 A1* | 4/2012 | Zhu | G05D 1/0214 701/23 |
| 2013/0222127 A1* | 8/2013 | Ray Avalani | B60Q 9/008 340/436 |
| 2014/0195213 A1 | 7/2014 | Kozloski | |
| 2014/0236414 A1 | 8/2014 | Droz | |
| 2015/0369197 A1* | 12/2015 | Cunningham | F02N 11/0803 701/113 |
| 2015/0371519 A1* | 12/2015 | Shimoharada | G08B 21/02 340/573.1 |
| 2017/0057496 A1* | 3/2017 | Toyoda | B60W 30/09 |

\* cited by examiner

PREDICTING VEHICLE MOVEMENTS BASED ON DRIVER BODY LANGUAGE

TECHNICAL FIELD

The disclosure relates generally to methods, systems, and apparatuses for automated driving or for assisting a driver of a vehicle and more particularly relates to methods, systems, and apparatuses for perception of driver head orientation and driver gestures in other vehicles to aid in estimation or prediction of driver intent.

BACKGROUND

Automobiles provide a significant portion of transportation for commercial, government, and private entities. Autonomous vehicles and driving assistance systems are currently being developed and deployed to provide safety, reduce an amount of user input required, or even eliminate user involvement entirely. For example, some driving assistance systems, such as crash avoidance systems, may monitor driving, positions, and a velocity of the vehicle and other objects while a human is driving. When the system detects that a crash or impact is imminent, the crash avoidance system may intervene and apply a brake, steer the vehicle, or perform other avoidance or safety maneuvers. As another example, autonomous vehicles may drive and navigate a vehicle with little or no user input. However, due to the dangers involved in driving and the costs of vehicles, it is extremely important that autonomous vehicles and driving assistance systems operate safely and are able to accurately navigate roads and avoid other vehicles even in situations where both autonomous vehicles and human-driven vehicles are present.

BRIEF DESCRIPTION OF THE DRAWINGS

Non-limiting and non-exhaustive implementations of the present disclosure are described with reference to the following figures, wherein like reference numerals refer to like parts throughout the various views unless otherwise specified. Advantages of the present disclosure will become better understood with regard to the following description and accompanying drawings where.

DETAILED DESCRIPTION

Figure 1:
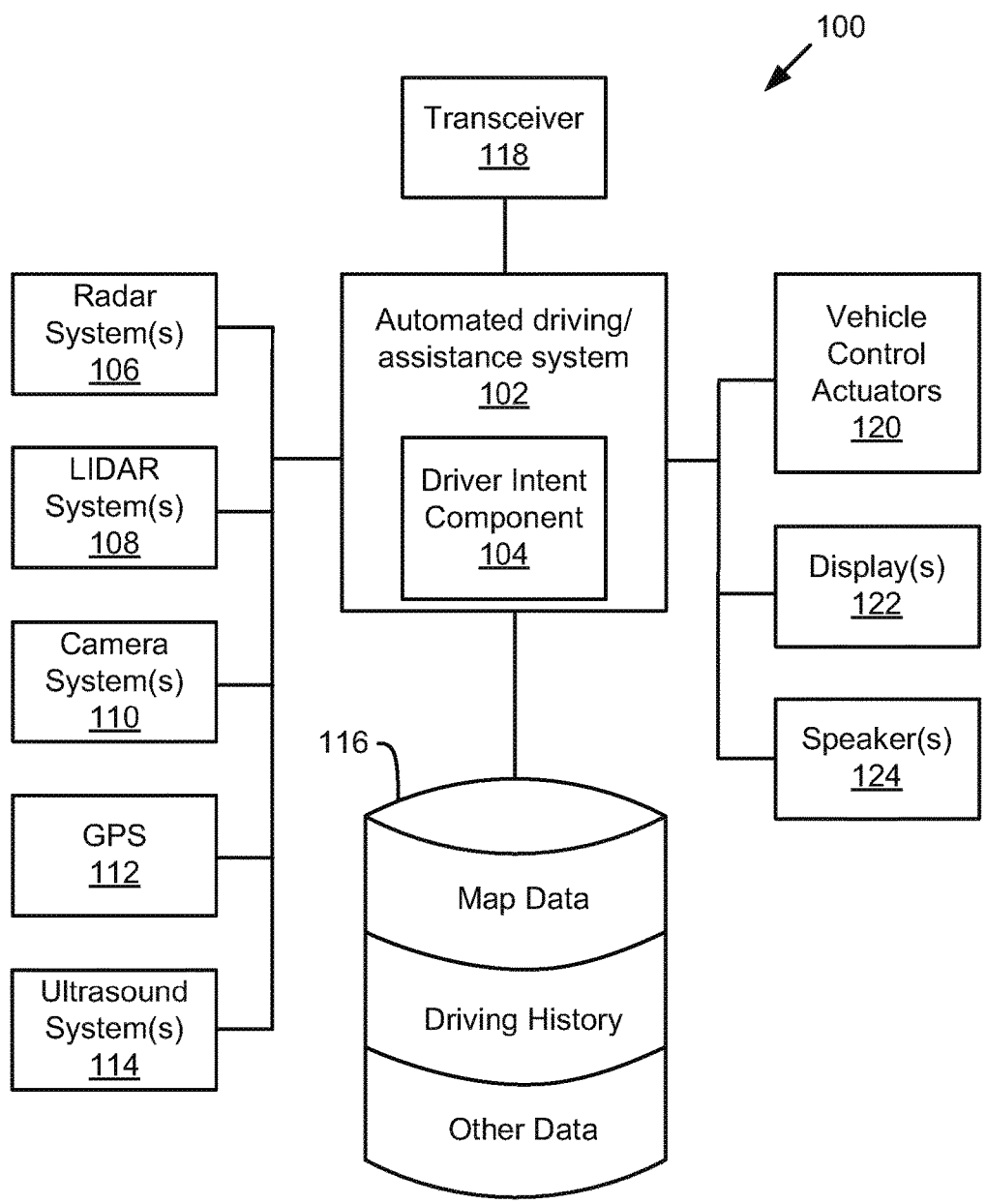
FIG. 1 is a schematic block diagram illustrating an implementation of a vehicle control system that includes an automated driving/assistance system.

Applicants have recognized that the first generations of autonomous vehicles must drive safely alongside human drivers. Thus, it is desirable for these autonomous vehicles to be able to predict the motion of surrounding vehicles, even if they are human-driven. These predictions can be made more accurate if the intentions of those other drivers can be inferred with the help of information about their body language, including the direction of their gaze over time and any gestures they make, such as waving to signal another car to go first at a four-way stop. For example, an autonomous vehicle may interpret body language of a human driver located in a different vehicle. Thus, the autonomous vehicle does not depend on the other vehicle to provide specific information about what the human driver is intending to do.

This disclosure teaches the incorporation of information about the gaze direction and other gestures of drivers in other vehicles into the autonomous vehicle's predictions about the motion that other vehicles are likely to pursue. Autonomous vehicles may be outfitted with sensors and sensing devices that are able to capture relevant information from every direction at all times. Computer vision algorithms employing deep neural networks are trained to estimate the direction of a driver's gaze and recognize key gestures made by drivers. Neural networks are also trained to correlate this body language to the expected subsequent motion of these other drivers' vehicles. This disclosure may also use information from LIDAR or other range sensors to help determine areas of interest within a given camera image and further supplement the detection of gestures and other relevant information.

According to one embodiment, an autonomous vehicle may locate vehicles within a current 360 degree frame of sensor data from one or more sensor source. The autonomous vehicle may determine one or more boundary boxes around areas of the image where the drivers of those vehicles would be found. The autonomous vehicle may provide the image data and range sensor data within the one or more boundary boxes to algorithms that will estimate driver head orientation and gaze direction and recognize the driver's gestures. The autonomous vehicle may then use the resulting estimates for driver body language to interpret driver intent in terms of predicted motion of the other vehicles.

In one embodiment, prediction algorithms for predicting what a human driver will do based on body language may be hard-coded or may be learned and modified using artificial intelligence. For example, gestures or body language of a human driver may be monitored or learned during a driving event and then the gestures or body language may be associated with a resulting vehicle movement.

In the following disclosure, reference is made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used herein, "autonomous vehicle" may be a vehicle that acts or operates completely independent of a human driver; or may be a vehicle that acts or operates independent of a human driver in some instances while in other instances a human driver may be able to operate the vehicle; or may be a vehicle that is predominantly operated by a human driver, but with the assistance of an automated driving/assistance system.

Implementations of the systems, devices, and methods disclosed herein may comprise or utilize a special purpose or general-purpose computer including computer hardware, such as, for example, one or more processors and system memory, as discussed in greater detail below. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash computer, personal computers, desktop computers, laptop computers, message processors, hand-held devices, multi-processor systems, microprocessor-based or programmable consumer electronics, network PCs, mini-computers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the following description and claims to refer to particular system components. As one skilled in the art will appreciate, components may be referred to by different names. This document does not intend to distinguish between components that differ in name, but not function.

Referring now to the figures, FIG. 1 illustrates a vehicle control system 100 that includes an automated driving/assistance system 102. The automated driving/assistance system 102 may be used to automate or control operation of a vehicle, such as a car, truck, van, bus, large truck, emergency vehicles or any other automobile for transporting people or goods, or to provide assistance to a human driver. For example, the automated driving/assistance system 102 may control one or more of braking, steering, acceleration, lights, alerts, driver notifications, radio, or any other auxiliary systems of the vehicle. In another example, the automated driving/assistance system 102 may not be able to provide any control of the driving (e.g., steering, acceleration, or braking), but may provide notifications and alerts to assist a human driver in driving safely. The automated driving/assistance system 102 includes a driver intent component 104, which may predict a future movement of a different vehicle based on driver body language of the different vehicle. For example, the driver intent component 104 may estimate an intention of the driver of the different vehicle (e.g., a vehicle that does not include the vehicle control system 100) based on a gesture, a gaze direction, a head orientation, or any other body language of the driver of the different vehicle.

The vehicle control system 100 also includes one or more sensor systems/devices for detecting a presence of nearby objects or determining a location of a parent vehicle (e.g., a vehicle that includes the vehicle control system 100) or nearby objects. For example, the vehicle control system 100 may include one or more radar systems 106, one or more LIDAR systems 108, one or more camera systems 110, a global positioning system (GPS) 112, and/or one or more ultrasound systems 114. The vehicle control system 100 may include a data store 116 for storing relevant or useful data for navigation and safety, such as map data, driving history or other data. The vehicle control system 100 may also include a transceiver 118 for wireless communication with a mobile or wireless network, other vehicles, infrastructure, or any other communication system. The vehicle control system 100 may include vehicle control actuators 120 to control various aspects of the driving of the vehicle, such as electric motors, switches or other actuators, to control braking, acceleration, steering or the like. The vehicle control system 100 may also include one or more displays 122, speakers 124, or other devices so that notifications to a human driver or passenger may be provided. The display 122 may include a heads-up display, a dashboard display or indicator, a display screen, or any other visual indicator, which may be seen by a driver or passenger of a vehicle. The speakers 124 may include one or more speakers of a sound system of a vehicle or may include a speaker dedicated to driver notification.

It will be appreciated that the embodiment of FIG. 1 is given by way of example only. Other embodiments may include fewer or additional components without departing from the scope of the disclosure. Additionally, illustrated components may be combined or included within other components without limitation. For example, the driver intent component 104 may be separate from the automated driving/assistance system 102 and the data store 116 may be included as part of the automated driving/assistance system 102 and/or part of the driver intent component 104.

The radar system 106 may include any radar system well known in the art. Principles of operation and performance of radar systems are generally well understood. In general, a radar system 106 operates by transmitting radio signals and detecting reflections off objects. In ground applications, the radar may be used to detect physical objects, such as other vehicles, parking barriers or parking chocks, landscapes (such as trees, cliffs, rocks, hills, or the like), road edges, signs, buildings, or other objects. The radar system 106 may use the reflected radio waves to determine a size, shape, distance, surface texture, or other information about a physical object or material. For example, the radar system 106 may sweep an area to obtain data about objects within a specific range and viewing angle of the radar system 106. In one embodiment, the radar system 106 is configured to generate perception information from a region near the vehicle, such as one or more regions nearby or surrounding the vehicle. For example, the radar system 106 may obtain data about regions of the ground or vertical area immediately neighboring or near the vehicle. The radar system 106 may include one of many widely available commercially available radar systems. In one embodiment, the radar system 106 may provide perception data including a two dimensional or three-dimensional map or model to the automated driving/assistance system 102 for reference or processing.

The LIDAR system 108 may include any LIDAR system known in the art. Principles of operation and performance of LIDAR systems are generally well understood. In general, the LIDAR system 108 operates by emitting visible wavelength or infrared wavelength lasers and detecting reflections of the laser light off objects. In ground applications, the lasers may be used to detect physical objects, such as other vehicles, parking barriers or parking chocks, landscapes (such as trees, cliffs, rocks, hills, or the like), road edges, signs, buildings, or other objects. The LIDAR system 108 may use the reflected laser light to determine a size, shape, distance, surface texture, or other information about a physical object or material. For example, the LIDAR system 108 may sweep an area to obtain data or objects within a specific range and viewing angle of the LIDAR system 108. For example, the LIDAR system 108 may obtain data about regions of the ground or vertical area immediately neighboring or near the vehicle. The LIDAR system 108 may include one of many widely available commercially available LIDAR systems. In one embodiment, the LIDAR system 108 may provide perception data including a two dimensional or three-dimensional model or map of detected objects or surfaces.

The camera system 110 may include one or more cameras, such as visible wavelength cameras or infrared cameras. The camera system 110 may provide a video feed or periodic images, which can be processed for object detection, road identification and positioning, or other detection or positioning. In one embodiment, the camera system 110 may include two or more cameras, which may be used to provide ranging (e.g., detecting a distance) for objects within view. In one embodiment, image processing may be used on captured camera images or video to detect vehicles, drivers, gestures, and/or body language of a driver.

The GPS system 112 is one embodiment of a positioning system that may provide a geographical location of the vehicle based on satellite or radio tower signals. GPS systems are well known and widely available in the art. Although GPS systems 112 can provide very accurate positioning information, GPS systems 112 generally provide little or no information about distances between the vehicle and other objects. Rather, they simply provide a location, which can then be compared with other data, such as maps, to determine distances to other objects, roads, or locations of interest.

The ultrasound system 114 may be used to detect objects or distances between a vehicle and objects using ultrasonic waves. For example, the ultrasound system 114 may emit ultrasonic waves from a location on or near a bumper or side panel location of a vehicle. The ultrasonic waves, which can travel short distances through air, may reflect off other objects and be detected by the ultrasound system 114. Based on an amount of time between emission and reception of reflected ultrasonic waves, the ultrasound system 114 may be able to detect accurate distances between a bumper or side panel and any other objects. Due to its shorter range, ultrasound systems 114 may be more useful to detect objects during parking or to detect imminent collisions during driving.

In one embodiment, the radar system(s) 106, the LIDAR system(s) 108, the camera system(s) 110, and the ultrasound system(s) 114 may detect environmental attributers or obstacles near a vehicle. For example, the systems 106-110 and 114 may detect other vehicles, pedestrians, people, animals, a number of lanes, lane width, shoulder width, road surface curvature, road direction curvature, rumble strips, lane markings, presence of intersections, road signs, bridges, overpasses, barriers, medians, curbs, or any other details about a road. As a further example, the systems 106-110 and 114 may detect environmental attributes that include information about structures, objects, or surfaces near the road, such as the presence of drive ways, parking lots, parking lot exits/entrances, sidewalks, walkways, trees, fences, buildings, parked vehicles (on or near the road), gates, signs, parking strips, or any other structures or objects.

The data store 116 stores map data, driving history, and other data, which may include other navigational data, settings, or operating instructions for the automated driving/assistance system 102. The map data may include location data, such as GPS location data, for roads, parking lots, parking stalls, or other places where a vehicle may be driven or parked. For example, the location data for roads may include location data for specific lanes, such as lane direction, merging lanes, highway or freeway lanes, exit lanes, or any other lane or division of a road. The location data may also include locations for each parking stall in a parking lot or for parking stalls along a road. In one embodiment, the map data includes location data about one or more structures or objects on or near the roads or parking locations. For example, the map data may include data regarding GPS sign location, bridge location, building or other structure location, or the like. In one embodiment, the map data may include precise location data with accuracy within a few meters or within sub meter accuracy. The map data may also include location data for paths, dirt roads, or other roads or paths, which may be driven by a land vehicle.

The driving history (or drive history) may include location data for past trips or parking locations of the vehicle. For example, the driving history may include GPS location data for the previous trips or paths taken. As an example, the driving history may include distance or relative location data with respect to lane lines, signs, road border lines, or other objects or features on or near the roads. The distance or relative location data may be determined based on GPS data, radar data, LIDAR data, camera data, or other sensor data gathered during the previous or past trips taken by the vehicle. In one embodiment, the automated driving/assistance system 102 is configured to log driving data to the data store 116 for and during any trips or drives taken by the vehicle.

The transceiver 118 is configured to receive signals from one or more other data or signal sources. The transceiver 118 may include one or more radios configured to communicate according to a variety of communication standards and/or using a variety of different frequencies. For example, the transceiver 118 may receive signals from other vehicles. Receiving signals from another vehicle is referenced herein as vehicle-to-vehicle (V2V) communication. In one embodiment, the transceiver 118 may also be used to transmit information to other vehicles to potentially assist them in locating vehicles or objects. During V2V communication the transceiver 118 may receive information from other vehicles about their locations, other traffic, accidents, road conditions, the locations of parking barriers or parking chocks, or any other details that may assist the vehicle and/or automated driving/assistance system 102 in driving accurately or safely. For example, the transceiver 118 may receive updated models or algorithms for use by a driver intent component 104 in detecting body language of a driver of another vehicle.

The transceiver 118 may receive signals from other signal sources that are at fixed locations. Infrastructure transceivers may be located at a specific geographic location and may transmit its specific geographic location with a time stamp. Thus, the automated driving/assistance system 102 may be able to determine a distance from the infrastructure transceivers based on the time stamp and then determine its location based on the location of the infrastructure transceivers. In one embodiment, receiving or sending location data from devices or towers at fixed locations is referenced herein as vehicle-to-infrastructure (V2X) communication. In one embodiment, the term V2X communication may also encompass V2V communication.

In one embodiment, the transceiver 118 may send and receive location data via a mobile network or cell connection. For example, the transceiver 118 may receive updated location data for a specific area as a vehicle travels along a roadway. Similarly, the transceiver 118 may receive historical driving data for a parent vehicle or other vehicles that have driven along a road or parked in a parking lot at that location or at that stall. For example, the transceiver 118 may receive data that indicates locations of signs, parking barriers or parking chocks, or other objects, which may be detectable using a radar system 106, LIDAR system 108, camera system 110, GPS system 112, or ultrasound system 114. If the transceiver 118 is able to receive signals from three or more infrastructure transceivers, the automated driving/assistance system 102 may be able to triangulate its geographic location.

In one embodiment, the transceiver 118 may send and receive data regarding body language of drivers. For example, one or more gestures or gaze directions detected during an event, and a resulting action by a driver, may be uploaded to a server for processing as part of machine learning for driver intent estimation.

In one embodiment, the automated driving/assistance system 102 is configured to control driving or navigation of a parent vehicle. For example, the automated driving/assistance system 102 may control the vehicle control actuators 120 to drive a path on a road, parking lot, driveway or other location. For example, the automated driving/assistance system 102 may determine a path and speed to drive based on information or perception data provided by any of the components 106-118. As another example, the automated driving/assistance system 102 may determine when to wait or proceed at an intersection, when to change lanes, when to leave space for another vehicle to change lanes, or the like.

In one embodiment, the driver intent component 104 is configured to determine an intent of a driver of a nearby vehicle and/or predict a future movement, and timing for the movement, of a vehicle under control of a human driver.

Figure 2:
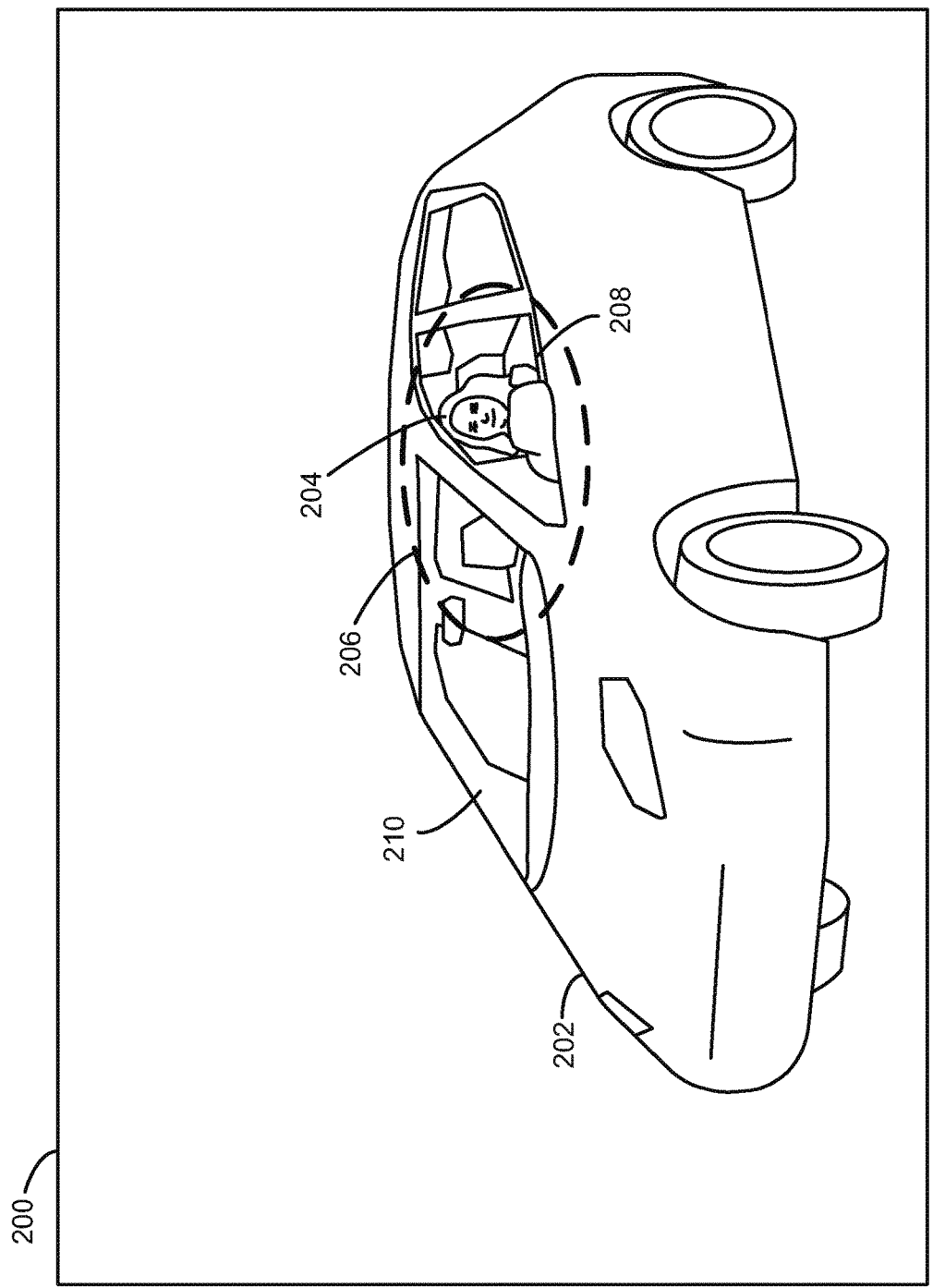
FIG. 2 illustrates a perspective view of a vehicle.

FIG. 2 illustrates an image 200 captured by a camera or other sensor of a vehicle or an autonomous vehicle. The image 200 includes a perspective view of a vehicle 202 with a human driver 204. For example, the view of the vehicle 202 may be captured by a camera at or near an intersection. The driver intent component 104 may identify the vehicle 202 as a vehicle within the captured image 200. The driver intent component 104 may determine a sub-region 206 of the image 200 that corresponds to a location or likely location of a driver 204. For example, the driver intent component 104 may identify a portion of the vehicle 202 where a driver 204 would usually sit, such as where a driver's seat would be located, etc.

In one embodiment, the driver intent component 104 may identify one or more windows of the vehicle 202, such as a driver's side window 208 and/or a windshield 210. In one embodiment, the driver intent component 104 may define the sub-region 206 of the vehicle 202 based on the location of the likely location of a driver 204, one or more windows 208, 210 of the vehicle 202, or by detecting a face of the driver 204. A sub-region 206 encompassing where the driver 204 may be located or reasonably expected to be located may be large enough to account for movements of the driver 204 (e.g., movements of the arms and/or head of the driver 204). By selecting or defining the sub-region 206, the driver intent component 104 may reduce computing power because a smaller area, or fewer pixels than the whole image 200, may be analyzed to detect the driver 204, including a gaze direction, a head orientation, and/or a gesture of the driver 204.

Figure 3:
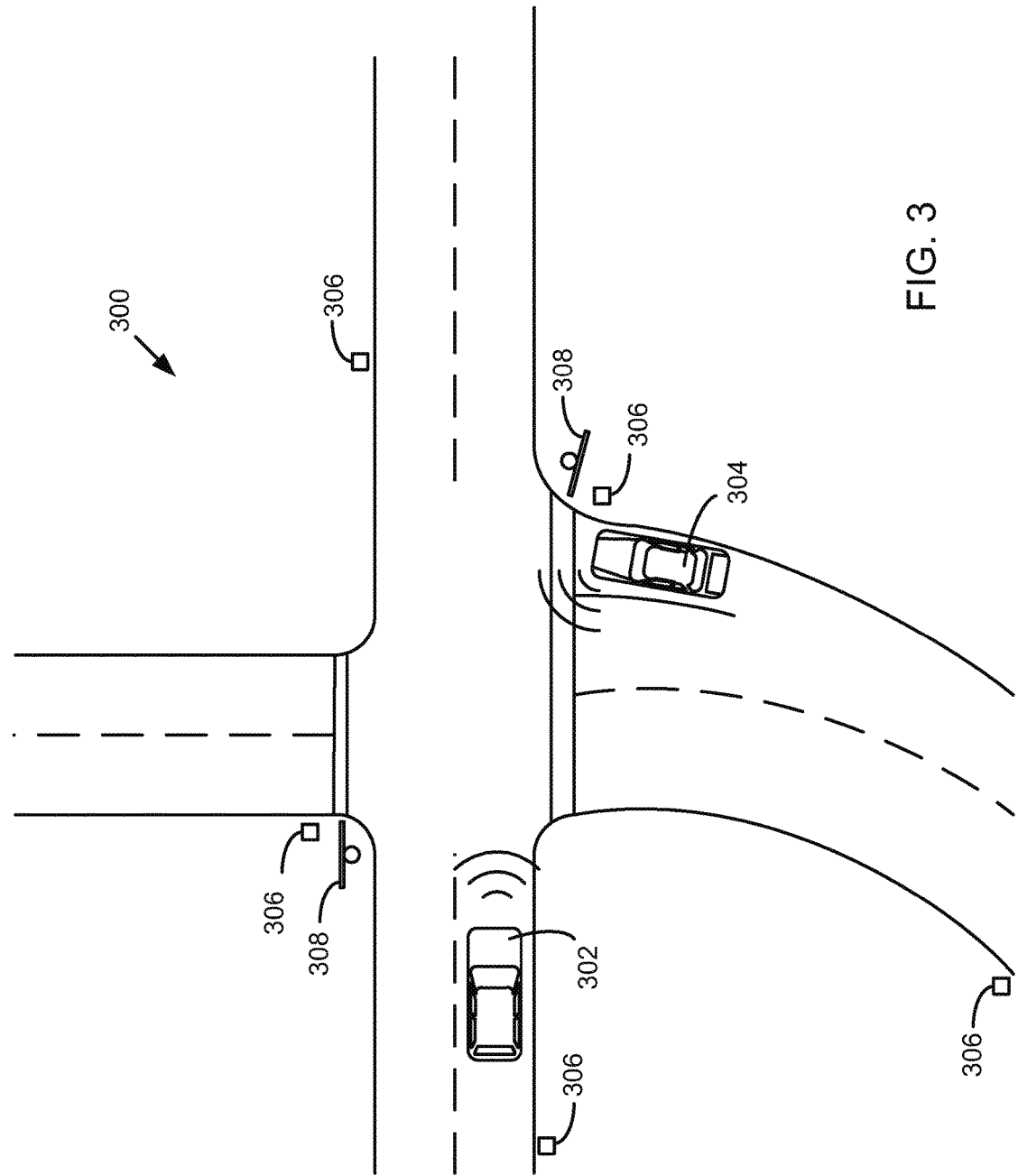
FIG. 3 is a schematic diagram illustrating a top view of an example road environment.

FIG. 3 is a schematic top view of a road 300 with a vehicle 302 traveling on the road. The vehicle 302 may include the system 100 of FIG. 1. In one embodiment, one or more sensors, such as the camera system 110, may gather perception data of the road 300 and regions around the vehicle 302. A viewing area of the camera system 110, the LIDAR system 108, the radar system 106 or other system may extend in any direction or all directions around the vehicle 302. The vehicle 302, or a driver intent component 104 of the vehicle 302, may receive perception data from the sensors and detect the presence of other vehicles, objects, surfaces, or the like within a viewing range of the vehicle 302. For example, the vehicle 302 may detect and identify vehicle 304 as a different vehicle. In one embodiment, the vehicle 302 may identify a sub-portion of perception data that corresponds to a location where a driver will likely be located, such as a window of the vehicle or a region of the vehicle where a driver will likely be seated. The vehicle 302 may analyze the sub-portion of the perception data to infer an intent of the driver. For example, the vehicle 302, or a driver intent component 104 of the vehicle 302, may infer an intent of a driver to drive, stop, wait, or perform any other driving maneuver. Based on the inferred intent, the vehicle 302 may slow down, speed up, and/or turn to avoid a potential collision.

In addition to perception data, the vehicle 302 may obtain information from a stored map, stored driving history, or from wireless signals. For example, an infrastructure transmitter 306 is shown near the road 300, which may provide specific positioning, environmental attribute details, or other information to the vehicle 302. As further examples, the vehicle 302 may receive information from other vehicles, such as vehicle 304, or from a wireless communication network, such as a mobile communication network. The vehicle 302 may further detect road signs 308 to determine or detect the presence of an intersection, road types, speed limits, locations, and the like.

Figure 4:
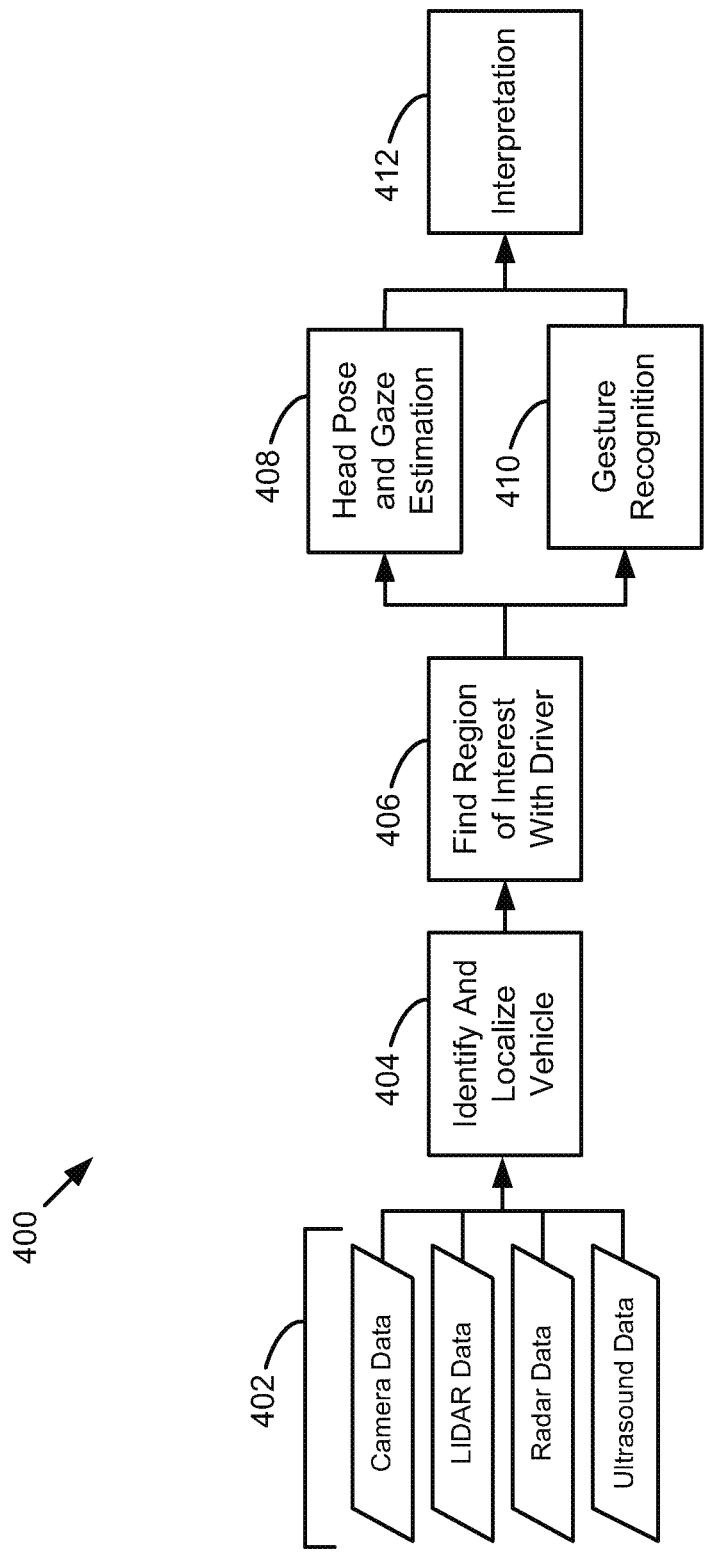
FIG. 4 is a schematic block diagram illustrating prediction of future vehicle movements, according to one implementation.

FIG. 4 is a schematic block diagram illustrating a method 400 for determining a driver's intent in another vehicle. Perception data, such as camera data, LIDAR data, radar data, and ultrasound data, is obtained at 402 and a driver intent component 104 identifies and localizes a vehicle based on the perception data at 404. For example, the driver intent component 104 may identify a region of a viewing area or a region of an image that corresponds to a vehicle. The driver intent component 104 finds a region of interest at 406 that includes the driver of the vehicle. The region of interest may include a window, a region of the vehicle that corresponds a driver's seat, or the like. The driver intent component 104 estimates head pose and gaze direction at 408 and performs gesture recognition at 410. Based on any head pose, gaze direction, or gesture detected, the driver intent component 104 interprets a driver's intent and/or predicts future motion of the driver's vehicle at 412.

Figure 5:
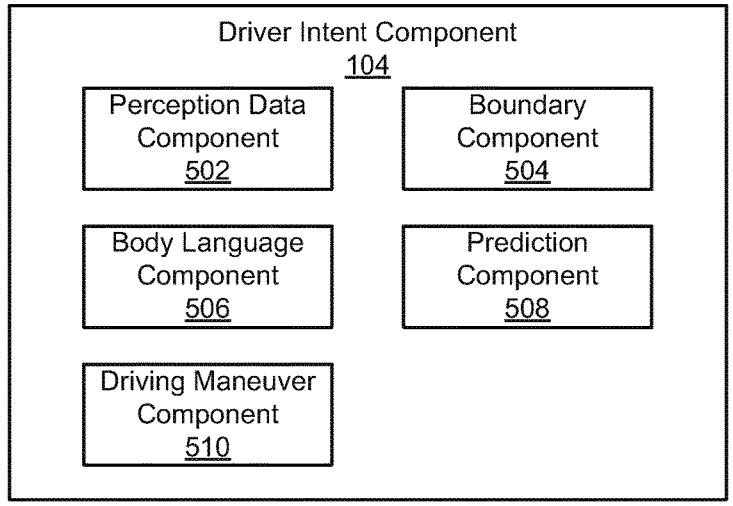
FIG. 5 is a schematic block diagram illustrating example components of a driver intent component, according to one implementation.

FIG. 5 is a schematic block diagram illustrating components of a driver intent component 104, according to one embodiment. The driver intent component 104 includes a perception data component 502, a boundary component 504, a body language component 506, a prediction component 508, and a driving maneuver component 510. The components 502-510 are given by way of illustration only and may not all be included in all embodiments. In fact, some embodiments may include only one or any combination of two or more of the components 502-510 without departing from the scope of the disclosure. Some of the components 502-510 may be located outside the driver intent component 104, such as within the automated driving/assistance system 102 or elsewhere.

The perception data component 502 is configured to receive sensor data from one or more sensor systems of the vehicle. For example, the perception data component 502 may receive data from a radar system 106, LIDAR system 108, camera system 110, GPS 112, ultrasound system 114, or the like. In one embodiment, the perception data may include perception data for one or more regions near a vehicle. For example, sensors of a vehicle may provide a 360 degree view around a vehicle. In one embodiment, a camera system 110 captures an image of a vehicle. For example, the vehicle may be proximal to a parent vehicle of the driver intent component 104.

The boundary component 504 is configured to identify a sub-region of perception data that corresponds to a driver of a vehicle or a region near a driver of a vehicle. For example, the boundary component 504 may identify a sub-region of an image or other sensor data frame that will likely contain a driver of the vehicle, if present. The sub-region may be large enough to allow for movement of the driver, such as for gestures. In one embodiment, the sub-region may correspond to an area where body language algorithms may be applied without wasting processing power to detect gestures or drivers in areas where they are likely not located.

In one embodiment, the boundary component 504 is configured to locate one or more vehicles within images or other perception data. For example, object recognition algorithms may be used to identify detected objects or obstacles as vehicles. In one embodiment, the boundary component 504 may identify a boundary of the vehicle and identify pixels or objects in that region as corresponding to the vehicle. Edge or boundary finding image processing algorithms may be used to find the edges of the vehicle.

In one embodiment, the boundary component 504 may identify or define a sub-portion of the image or corresponding to an area where a driver of a vehicle is located or is likely located. In one embodiment, the boundary component 504 may look within a boundary of the vehicle to locate or define a boundary corresponding to a driver location. In one embodiment, the boundary component 504 is configured to identify the sub-portion of the image based on a location of one or more windows, a location of a driver's seat or steering wheel of a vehicle, and/or a location of a detected human in the vehicle. In one embodiment, the boundary component 504 may identify a boundary of one or more windows or may estimate a location of a driver's-side front seat of a vehicle. In one embodiment, the sub-region may correspond to or include the boundary of a window. For example, the sub-region may have a boundary following a boundary of one or more windows. In one embodiment, sub-region may have a boundary a little larger than a likely region where a driver is located to allow for movements or error in defining the boundary.

The body language component 506 is configured to detect a driver's body language. The body language component 506 may detect a driver's body language by identifying one or more of a driver's head orientation, a gaze direction, and a gesture. The head orientation may be an orientation of a person's head. For example, the head orientation may describe a direction that a driver's face is located. The head orientation may be described as one or more angles relative to a location of a parent vehicle of the driver intent component 104. For example, the angles may include an angle of the gaze direction with respect to a line drawn between a center of a vehicle (or other zero origin location used by an automated driving/assistance system 102) and the human driver. The gaze direction may include a direction in which a driver is looking. In some situations, the gaze direction may match a head orientation, but the gaze direction may also be different if the driver's eyes are not looking straight ahead. The gaze direction may be described as one or more angular offsets from the head orientation or may be described as angular directions independent of the head orientation.

Gestures may include any other type of body language including gestures, movements, or positions taking by the hands, arms, shoulders, neck, abdomen, face, head, or other parts of a body of the driver. Example gestures may include: waving gestures to wave another driver, a pedestrian, or cyclist to proceed at an intersection, road crossing, or lane merge; head movements indicating a no or yes; halt or stop hand signals where a hand is held up palm facing another vehicle or person with the fingers facing up; shrugs with shoulders; head movements from side to side to check for crossing vehicles; or any other gesture. Further gestures may be identified including gestures detected via machine learning or analysis of sensor data. In one embodiment, the body language component 506 may detect one or more of these gestures, or other gestures, performed by a driver of a nearby vehicle.

In one embodiment, the body language component 506 may save processing power by, at least initially, only attempting to detect body language within a boundary of an image or other perception data frame determined by the boundary component 504. For example only pixels, or the like, within the boundary may be processed by body language detection algorithms. Because gesture recognition, or recognition of other body language, can be computationally intensive, this can lead to significant time, processing, and energy savings for the driver intent component 104 or automated driving/assistance system 102.

The prediction component 508 may infer a driver intent or predict future motions of a nearby vehicle based on body language detected by the body language component 506. For example, the prediction component 508 may determine a timing and a movement that the driver intends to perform. Examples movements may include a turn onto a different road, waiting at an intersection, merging with traffic, changing lanes, exiting a roadway, entering a roadway, parking a vehicle, exiting a parking spot, or the like.

In one embodiment, the prediction component 508 references or processes a database or model to determine a predicted movement or intended movement of another vehicle. For example, the prediction component 508 may include or access a database or model that correlates body language with one or more future vehicle movements. In one embodiment, the database or model may correlate one or more of a head orientation, a gaze direction, and a gesture with one or more vehicle movements that are likely to occur following the head orientation, gaze direction, and/or gesture.

In one embodiment, the database or model may correlate future vehicle movements with one or more of, a waving motion of a hand, a hand gesture comprising a palm facing toward the vehicle with fingers upward, a gaze direction of the driver for a threshold period of time (such as when a driver is staring at another vehicle waiting for that vehicle to go or when a driver stares straight ahead to being or continue to drive forward, a series of head movements, and a series of quick changes in gaze direction (e.g., checking cross traffic). In one embodiment, the database or model may include a correlation between a gaze direction with a future driving direction. For example, the model may indicate a correlation between a driver looking in a specific direction followed by a vehicle moving in that specific direction. In one embodiment, the database or model correlates looking over a shoulder with future vehicle movement comprising a lane change or a turn. In one embodiment, the database or model may include one or more machine learned rules or correlations. For example, the database or model may include correlations and probabilities based on actual sensor data, head orientation, gaze directions, and gestures learned by a machine.

In one embodiment, the database or model also correlates an intention of a driver or a future driving maneuver based on a current driving context. For example, the same gestures may mean different things based on whether the nearby vehicle or parent vehicle is stopped at an intersection, approaching an intersection, driving down a road with one or more nearby vehicles, merging onto a roadway, exiting a roadway, entering a parking lot or parking spot, exiting a parking lot or parking spot, or the like. Thus, gestures and current driving context may be used to accurately infer an intent of a driver or predict a future driving maneuver. The prediction component 508 may provide the predicted driving maneuvers or driver intent to the driving maneuver component 510 or the automated driving/assistance system 102 for decision making for maneuvers or actions to be taken by the automated driving/assistance system 102 or a parent vehicle.

The driving maneuver component 510 is configured to select a driving maneuver for a parent vehicle based on the predicted driver intent or future driving maneuver of another vehicle. For example, the driving maneuver component 510 may receive one or more predicted driving maneuvers for one or more nearby vehicles from the prediction component 508. The driving maneuver component 510 may determine a driving path to avoid collision with the other vehicles in case they perform the predicted driving maneuvers. For example, the driving maneuver component 510 may determine whether to decelerate, accelerate, and/or turn a steering wheel of the parent vehicle. In one embodiment, the driving maneuver component 510 may determine a timing for the driving maneuver. For example, the driving maneuver component 510 may determine that a parent vehicle should wait at an intersection for a period of time because another vehicle is likely to proceed through the intersection during that time period.

Figure 6:
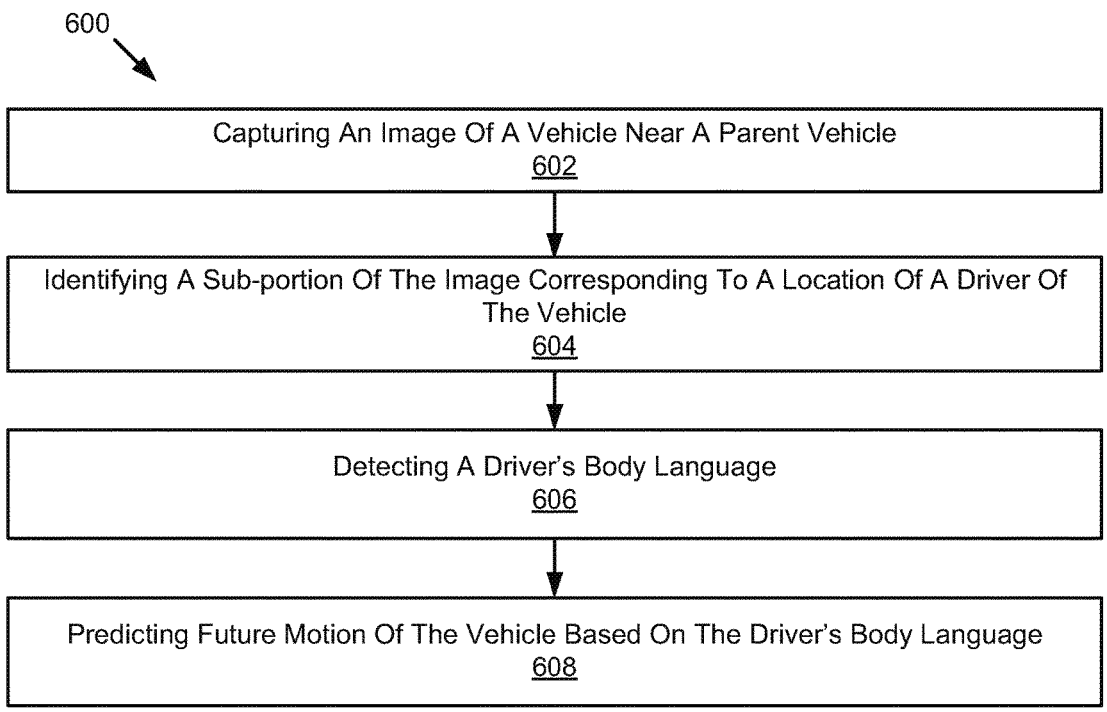
FIG. 6 is a schematic block diagram illustrating a method for predicting vehicle movements, according to one implementation.

Referring now to FIG. 6, a schematic flow chart diagram of a method 600 for predicting movement of a vehicle, according to one embodiment, is illustrated. The method 600 may be performed by an automated driving/assistance system or a driver intent component, such as the automated driving/assistance system 102 of FIG. 1 or the driver intent component 104 of FIG. 1 or 5.

The method 600 begins and a camera system 110 captures an image of a vehicle at 602. In other embodiments, information other than images may be used. For example, a LIDAR or radar frame may be captured in an area near a parent vehicle where the other vehicle is located. A boundary component 504 identifies a sub-portion of the image (or frame) that corresponds to an area where a driver of a vehicle is located, or is likely located at 604. A body language component 506 processes the sub-portion of the image or frame to detect a driver's body language at 606. In one embodiment, an image from a camera may provide best visibility through glass, although LIDAR or radar may also be used. A prediction component 508 predicts future motion of the vehicle based on the driver's body language at 608 detected by the body language component 506. For example, the prediction component 508 may access a database or model to identify one or more vehicle movements that correspond to the detected body language.

Figure 7:
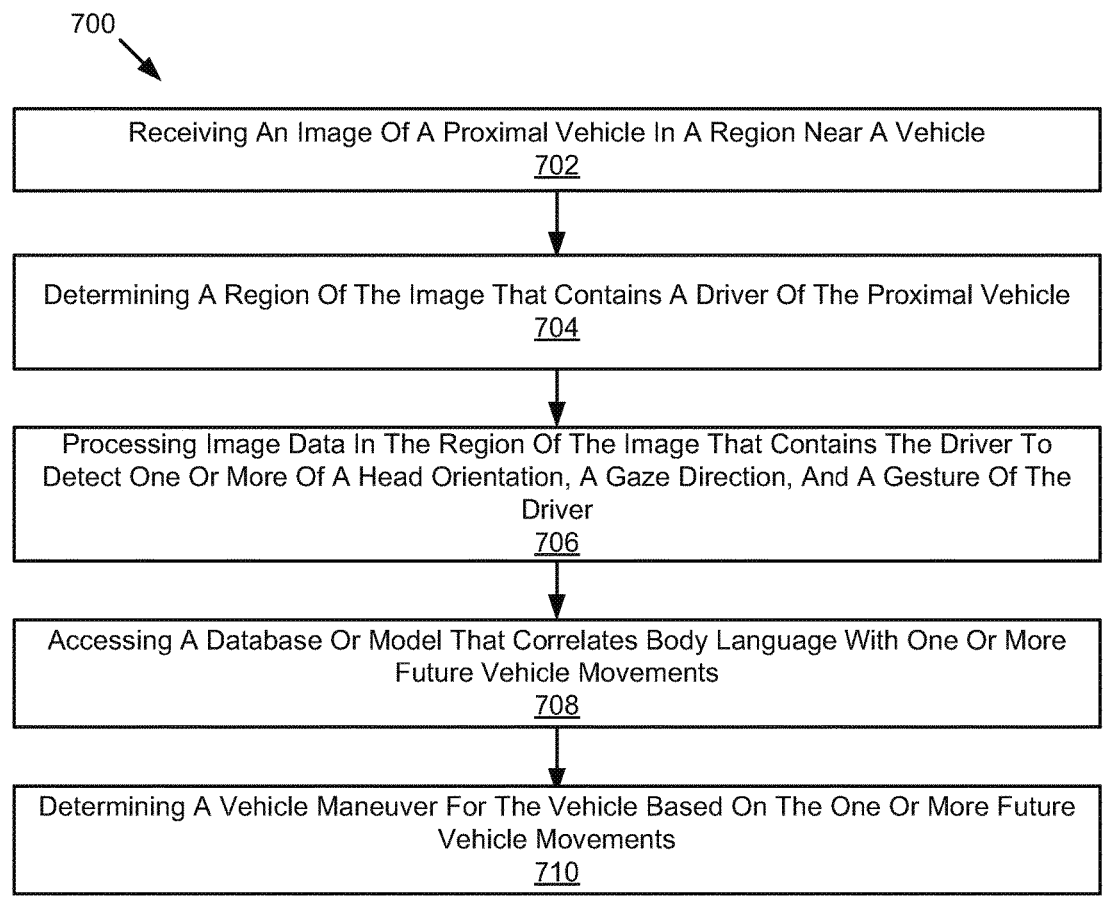
FIG. 7 is a schematic block diagram illustrating another method for predicting vehicle movements, according to one implementation.

Referring now to FIG. 7, a schematic flow chart diagram of a method 700 for determining vehicle maneuvers, according to one embodiment, is illustrated. The method 700 may be performed by an automated driving/assistance system or a driver intent component, such as the automated driving/assistance system 102 of FIG. 1 or the driver intent component 104 of FIG. 1 or 5.

The method 700 begins as a perception data component 502 receives an image of a proximal vehicle in a region near a vehicle at 702. A boundary component 504 determines a region of the image that contains a driver of the proximal vehicle at 704. A body language component 506 processes image data in the region of the image that contains the driver of the proximal vehicle to detect one or more of a head orientation, a gaze direction, and a gesture of the driver at 706. For example, the body language component 506 may include or access a graphical model to detect body language. A prediction component 508 accesses a database or model that correlates one or more of the head orientation, the gaze direction, and the gesture with one or more future vehicle movements at 708. A driving maneuver component 510 determines a vehicle maneuver based on the one or more future vehicle movements of the proximal vehicle at 710.

Examples

The following examples pertain to further embodiments.

Example 1 is a system that includes a camera system, a boundary component, a body language component, and a prediction component. The camera system is configured to capture an image of a vehicle. The boundary component is configured to identify a sub-portion of the image corresponding to an area where a driver of a vehicle is located. The body language component is configured to detect a driver's body language. The prediction component is configured to predict future motion of the vehicle based on the driver's body language detected by the body language component.

In Example 2, the body language component of Example 1 is configured to detect a driver's body language by identifying one or more of a driver's head orientation, a gaze direction, and a gesture.

In Example 3, the body language component of any of Examples 1-2 is configured to process image data in the sub-portion of the image to detect the driver's body language.

In Example 4, the boundary component of any of Examples 1-3 is configured locate the vehicle within the image.

In Example 5, the boundary component of any of Examples 1-4 is configured to identify the sub-portion of the image based one or more of identification of one or more windows and identification of a region of the vehicle where a driver would likely be located.

In Example 6, the prediction component of any of Examples 1-5 is configured to access a database or model that correlates the driver's body language detected by the body language component with one or more future vehicle movements. For example, the prediction component may predict future motion of the vehicle based on the database or model.

In Example 7, the database or model in Example 6 correlates one or more of the following with the one or more future vehicle movements: a waving motion of a hand; a hand gesture comprising a palm facing toward the vehicle with fingers upward; a gaze direction of the driver for a threshold period of time; a series of head movements; and a series of quick changes in gaze direction.

In Example 8, the database or model of any of Examples 6-7 correlates a gaze direction with a future driving direction.

In Example 9, the database or model of any of Examples 6-8 correlates a gesture with a current driving context, wherein the driving context comprises a stop at an intersection, an approach to an intersection, driving down a road with one or more nearby vehicles, merging onto a roadway, exiting a roadway, entering a parking lot or parking spot, exiting a parking lot or parking spot, or the like.

Example 10 is a computer implemented method. The method includes receiving an image of a proximal vehicle in a region near a vehicle. The method includes determining a region of the image that contains a driver of the proximal vehicle. The method includes processing image data in the region of the image that contains the driver of the proximal vehicle to detect one or more of a head orientation, a gaze direction, and a gesture of the driver. The method includes accessing a database or model that correlates one or more of the head orientation, the gaze direction, and the gesture with one or more future vehicle movements. The method further includes determining a vehicle maneuver based on the one or more future vehicle movements of the proximal vehicle.

In Example 11, the method of Example 10 further includes locating the vehicle within the image.

In Example 12, determining the region of the image that contains the driver in any of Examples 10-11 includes determining the region based one or more of a location of one or more windows of the vehicle and a predicted location of a driver's seat in the vehicle.

In Example 13, the database or model of any of Examples 10-12 correlates one or more of the following with the one or more future vehicle movements: a waving motion of a hand; a hand gesture comprising a palm facing toward the vehicle with fingers upward; a gaze direction of the driver for a threshold period of time; a series of head movements; and a series of changes in gaze direction.

Example 14 is a computer readable storage media storing instructions that, when executed by one or more processors, cause the processors to receive an image of a vehicle. The instructions further cause the processor to identify a boundary around a region of the image where a driver of a vehicle is located. The instructions further cause the processor to predict future motion of the vehicle based on the driver's body language, wherein the driver's body language comprise one or more of a driver's head orientation, a gaze direction, and a gesture.

In Example 15, the instructions of Example 14 further cause the processor to detect one or more of the driver's head orientation, the gaze direction, and the gesture.

In Example 16, detecting one or more of the driver's head orientation, the gaze direction, and the gesture in any of Examples 14-16 includes processing image data in the boundary to detect the head orientation, the gaze direction, and the gesture.

In Example 17, the instructions of Examples 14-17 further cause the processor to locate the vehicle within the image.

In Example 18, identifying the boundary around the region in any of Examples 14-18 includes one or more of identifying of one or more windows of the vehicle and identifying of a region of the vehicle where a driver would likely be located.

In Example 19, the instructions in any of Examples 14-18 further cause the processor to access a database or model that correlates one or more of the driver's head orientation, the gaze direction, and the gesture with one or more future vehicle movements In Example 20, the instructions in any of Examples 14-19 further cause the processor to determine a driving maneuver to be performed by a parent vehicle based on the predicted future motion.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

Embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A system comprising: a camera system configured to capture an image of a proximal vehicle; a boundary component configured to identify a sub-portion of the image corresponding to an area where a driver of the proximal vehicle is located, wherein the boundary component identifies the sub-portion by identifying one or more windows of the proximal vehicle; a body language component configured to detect a driver's body language by processing data within the sub-portion of the image; and a prediction component configured to predict future motion of the proximal vehicle based on the driver's body language detected by the body language component; wherein the prediction component is configured to access a database or model that correlates the driver's body language detected by the body language component with one or more future vehicle movements; wherein the database or model correlates a gesture with a current driving context, wherein the driving context comprises a stop at an intersection, an approach to an intersection, merging onto a roadway, exiting a roadway, entering a parking lot or parking spot, or exiting a parking lot or parking spot.

2. The system of claim 1, wherein the body language component is configured to detect a driver's body language by identifying one or more of a driver's head orientation, a gaze direction, and a gesture.

3. The system of claim 1, wherein the boundary component is configured to locate the proximal vehicle within the image.

4. The system of claim 1, wherein the boundary component is configured to identify the sub-portion of the image based on identification of a region of the vehicle where a driver would likely be located.

5. The system of claim 1, wherein the database or model correlates one or more of the following with the one or more future vehicle movements:
 a waving motion of a hand;
 a hand gesture comprising a palm facing toward a parent vehicle with fingers upward;
 a gaze direction of the driver for a threshold period of time;
 a series of head movements; and
 a series of quick changes in gaze direction.

6. The system of claim 1, wherein the database or model correlates a gaze direction with a future driving direction.

7. A computer implemented method comprising:
 receiving an image of a proximal vehicle in a region near a vehicle;
 determining a region of the image that contains a driver of the proximal vehicle, wherein determining the region comprises determining based on a location of one or more windows of the proximal vehicle;
 processing image data in the region of the image that contains the driver of the proximal vehicle to detect one or more of a head orientation, a gaze direction, and a gesture of the driver;
 accessing a database or model that correlates one or more of the head orientation, the gaze direction, and the gesture with one or more future vehicle movements for the proximal vehicle; and
 determining a vehicle maneuver for the vehicle based on the one or more future vehicle movements of the proximal vehicle;
 wherein the database or model correlates a gesture with a current driving context, wherein the driving context comprises a stop at an intersection, an approach to an intersection, merging onto a roadway, exiting a roadway, entering a parking lot or parking spot, or exiting a parking lot or parking spot.

8. The method of claim 7, further comprising locating the proximal vehicle within the image.

9. The method of claim 7, wherein determining the region of the image that contains the driver comprises determining the region based on a predicted location of a driver's seat in the vehicle.

10. The method of claim 7, wherein the database or model correlates one or more of the following with the one or more future vehicle movements:
 a waving motion of a hand;
 a hand gesture comprising a palm facing toward the vehicle with fingers upward;
 a gaze direction of the driver for a threshold period of time;
 a series of head movements; and
 a series of changes in gaze direction.

11. Non-transitory computer readable storage media storing instructions that, when executed by one or more processors, cause the processors to:
 receive an image of a proximal vehicle;
 identify a boundary around a region of the image where a driver of the proximal vehicle is located, wherein the instructions cause the one or more processors to identify the boundary based on identifying one or more windows of the proximal vehicle;
detecting one or more of a driver's head orientation, a gaze direction, and a gesture by processing image data in the boundary to detect the head orientation, the gaze direction, and the gesture; and
predict future motion of the proximal vehicle based on the driver's body language by accessing a database or model that correlates the driver's body language detected with one or more future vehicle movements; wherein the database or model correlates a gesture with a current driving context, wherein the driving context comprises a stop at an intersection, an approach to an intersection, merging onto a roadway, exiting a roadway, entering a parking lot or parking spot, or exiting a parking lot or parking spot, wherein the driver's body language comprise one or more of the driver's head orientation, the gaze direction, and the gesture.

12. The computer readable storage media of claim 11, wherein the instructions further cause the processor to locate the proximal vehicle within the image.

13. The computer readable storage media of claim 11, wherein identifying the boundary around the region comprises identifying of a region of the vehicle where a driver would likely be located.

14. The computer readable storage media of claim 11, wherein the instructions further cause the processor to access a database or model that correlates one or more of the driver's head orientation, the gaze direction, and the gesture with one or more future vehicle movements.

15. The computer readable storage media of claim 11, wherein the instructions further cause the one or more processor to determine a driving maneuver to be performed by a parent vehicle based on the predicted future motion.

* * * * *